US012811258B2

(12) United States Patent
Kim et al.

(10) Patent No.: US 12,811,258 B2
(45) Date of Patent: Nov. 24, 2026

(54) BATTERY CELL, BATTERY MODULE, AND BATTERY PACK INCLUDING THE SAME

(71) Applicant: LG Energy Solution, Ltd., Seoul (KR)

(72) Inventors: Tae Geun Kim, Daejeon (KR); Jinwoo Park, Daejeon (KR); Sangyoon Jeong, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 800 days.

(21) Appl. No.: 18/017,062

(22) PCT Filed: Jan. 19, 2022

(86) PCT No.: PCT/KR2022/001001
§ 371 (c)(1),
(2) Date: Jan. 19, 2023

(87) PCT Pub. No.: WO2022/158855
PCT Pub. Date: Jul. 28, 2022

(65) Prior Publication Data

US 2023/0299431 A1 Sep. 21, 2023

(30) Foreign Application Priority Data

Jan. 22, 2021 (KR) ........................ 10-2021-0009238

(51) Int. Cl.
*H01M 50/533* (2021.01)
*H01M 10/48* (2006.01)
(Continued)

(52) U.S. Cl.
CPC ......... *H01M 50/533* (2021.01); *H01M 10/48* (2013.01); *H01M 10/615* (2015.04); (Continued)

(58) Field of Classification Search
CPC .. H01M 10/425; H01M 10/48; H01M 10/615; H01M 10/647; H01M 10/653;
(Continued)

(56) References Cited

U.S. PATENT DOCUMENTS

2001/0044044 A1 11/2001 Kaito et al.
2013/0280585 A1 10/2013 Morisaki et al.
(Continued)

FOREIGN PATENT DOCUMENTS

CN 110098362 A 8/2019
JP 2001-357895 A 12/2001
(Continued)

OTHER PUBLICATIONS

Machine translation CN110098362A (Year: 2019).*
Machine translation JP2013098032A (Year: 2013).*

*Primary Examiner* — Victoria H Lynch
(74) *Attorney, Agent, or Firm* — BRYAN CAVE LEIGHTON PAISNER LLP

(57) ABSTRACT

A battery cell, a battery module, and a battery pack including the same are provided. The battery cell includes a battery case accommodating an electrode assembly and having outer periphery sealed by heat fusion, an electrode lead electrically connected to an electrode tab of the electrode assembly and protruding outward of the battery case, and a first protrusion and a second protrusion protruding in a direction to which the electrode lead protrudes formed on one side surface of the battery case, the electrode lead being located between the first protrusion and the second protrusion. Parts and processes are simplified for the battery cell and the battery module including the same, while increasing space utilization rate of the battery module.

15 Claims, 7 Drawing Sheets

(51) Int. Cl.

| | |
|---|---|
| ***H01M 10/615*** | (2014.01) |
| ***H01M 10/647*** | (2014.01) |
| ***H01M 10/653*** | (2014.01) |
| ***H01M 50/211*** | (2021.01) |
| ***H01M 50/502*** | (2021.01) |

(52) U.S. Cl.
CPC ....... *H01M 10/647* (2015.04); *H01M 10/653* (2015.04); *H01M 50/211* (2021.01); *H01M 50/502* (2021.01); *H01M 2220/20* (2013.01)

(58) Field of Classification Search
CPC ........... H01M 2220/20; H01M 50/105; H01M 50/178; H01M 50/211; H01M 50/502; H01M 50/533; H01M 50/548; H01M 50/557; Y02E 60/10
See application file for complete search history.

(56) References Cited

U.S. PATENT DOCUMENTS

| | | | | |
|---|---|---|---|---|
| 2015/0037664 | A1 | 2/2015 | Kang et al. | |
| 2019/0131596 | A1 | 5/2019 | Yang et al. | |
| 2019/0181505 | A1* | 6/2019 | Otsuka | H01M 50/136 |
| 2019/0237811 | A1 | 8/2019 | Park et al. | |
| 2020/0343604 | A1 | 10/2020 | Lee et al. | |
| 2020/0411924 | A1 | 12/2020 | Yun | |
| 2022/0247004 | A1 | 8/2022 | Yun | |

FOREIGN PATENT DOCUMENTS

| | | | |
|---|---|---|---|
| JP | 2013-098032 | A | 5/2013 |
| JP | 2013-222655 | A | 10/2013 |
| JP | 2014-049224 | A | 3/2014 |
| JP | 2020522855 | A | 7/2020 |
| KR | 10-2013-0124622 | A | 11/2013 |
| KR | 1020150025207 | A | 3/2015 |
| KR | 10-2015-0124124 | A | 11/2015 |
| KR | 10-2016-0071108 | A | 6/2016 |
| KR | 1020170013809 | A | 2/2017 |
| KR | 10-1743577 | B1 | 6/2017 |
| KR | 10-2018-0109478 | A | 10/2018 |
| KR | 10-2046122 | B1 | 11/2019 |
| KR | 10-2150679 | B1 | 9/2020 |
| KR | 10-2020-0125184 | A | 11/2020 |

* cited by examiner

【FIG. 1】
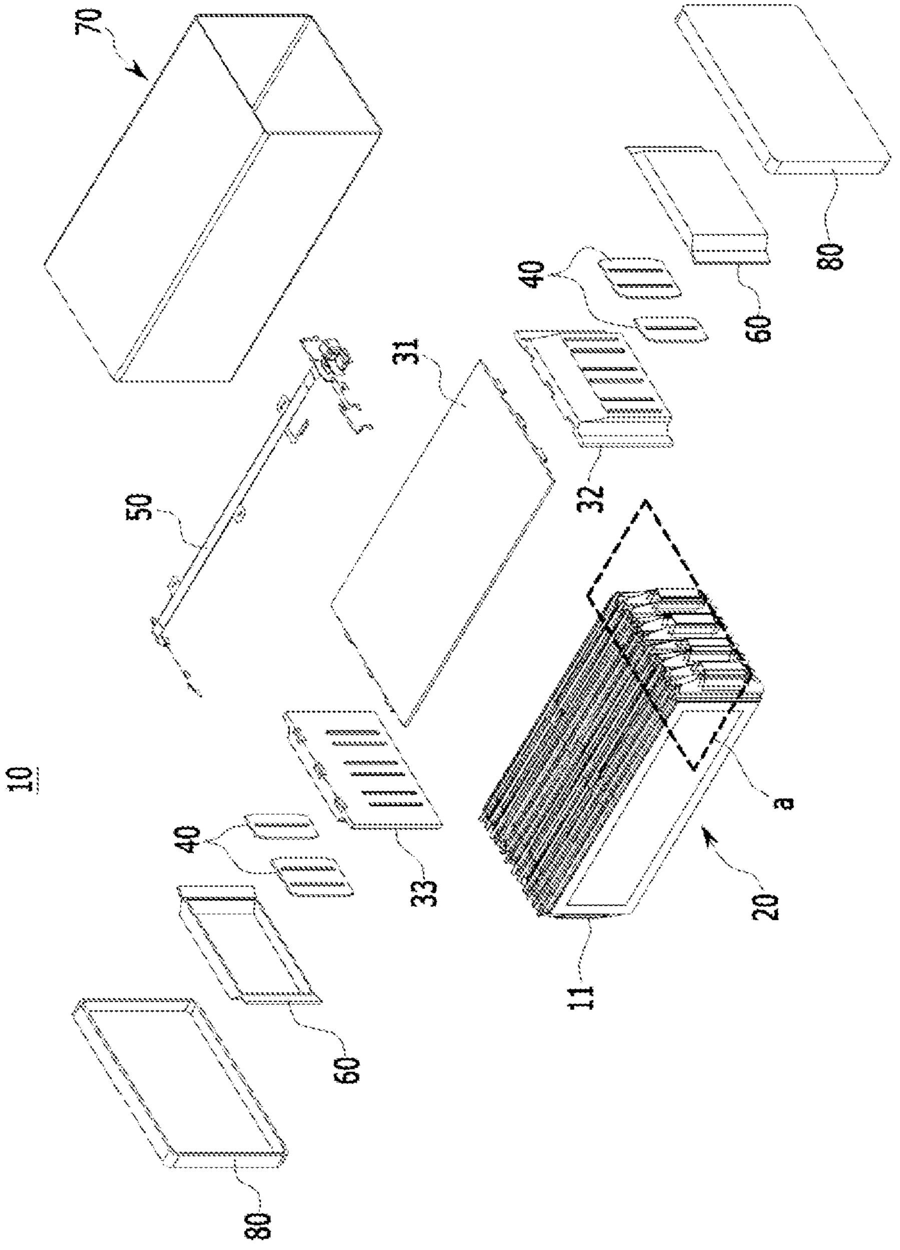
Related Art

【FIG. 2】
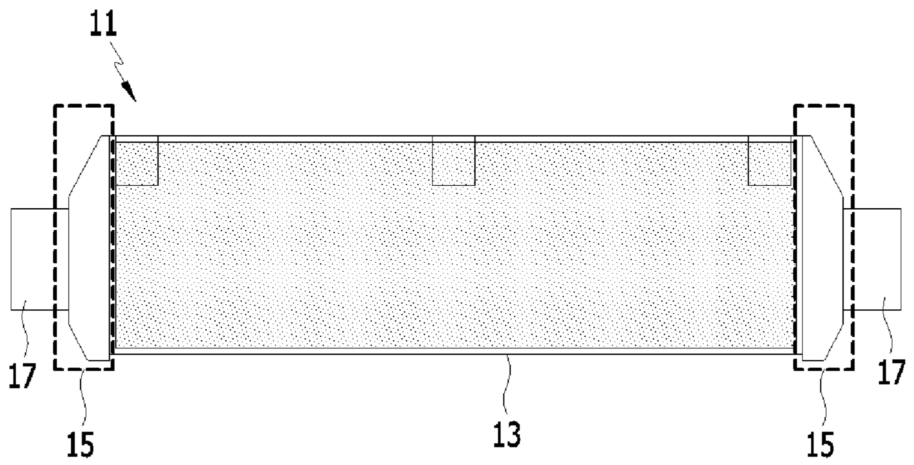
Related Art

【FIG. 3】
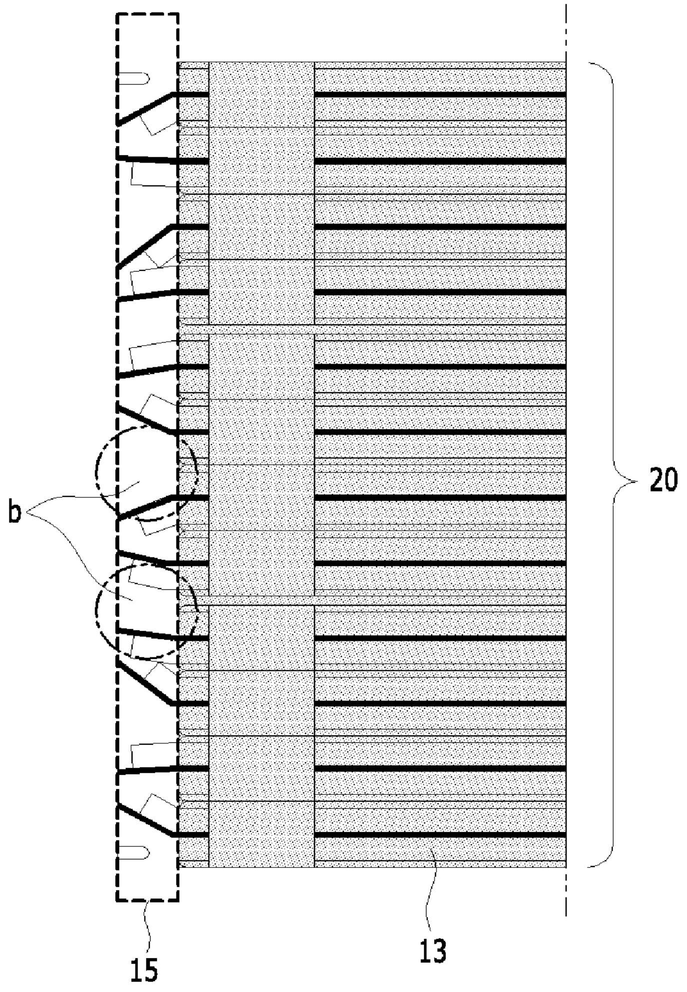
Related Art

【FIG. 4】
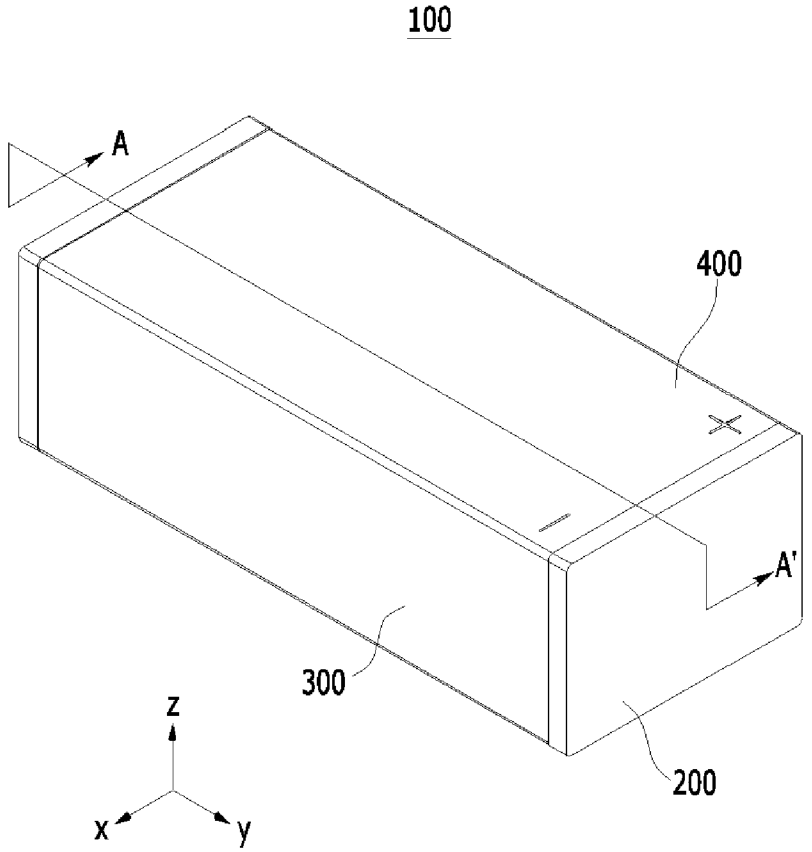

【FIG. 5】
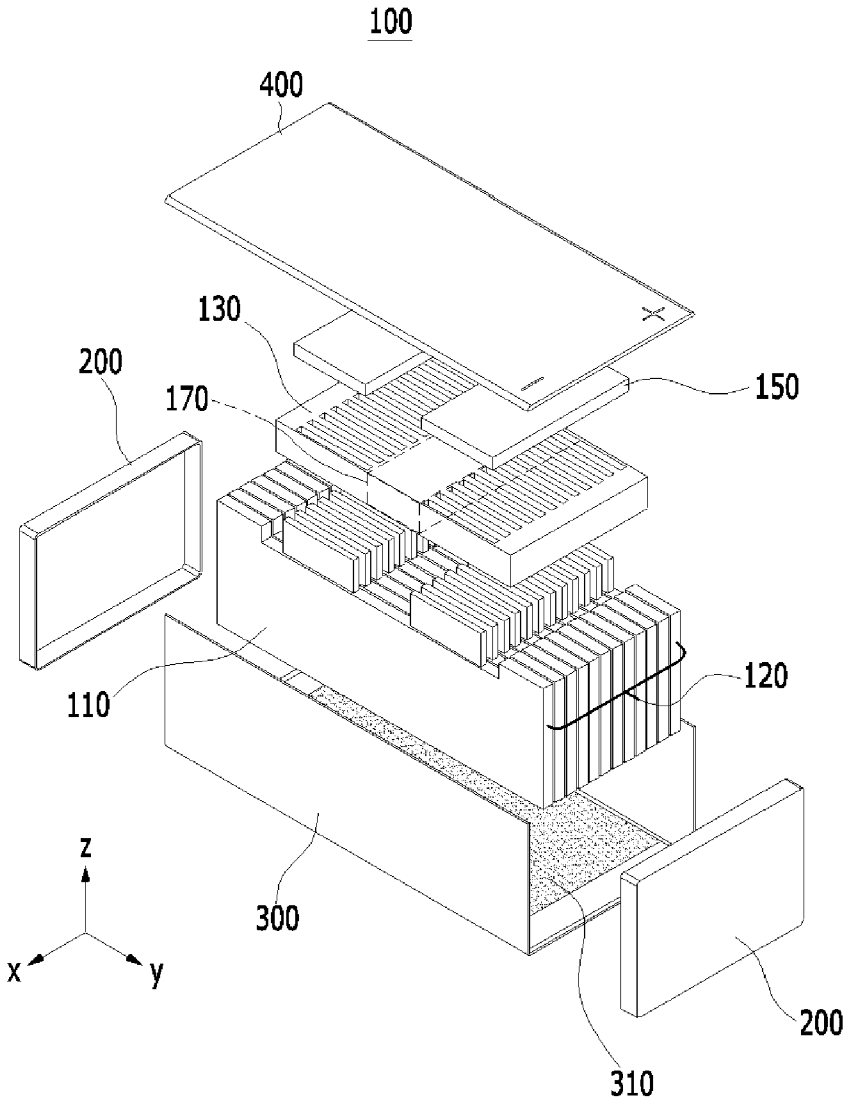

【FIG. 6】
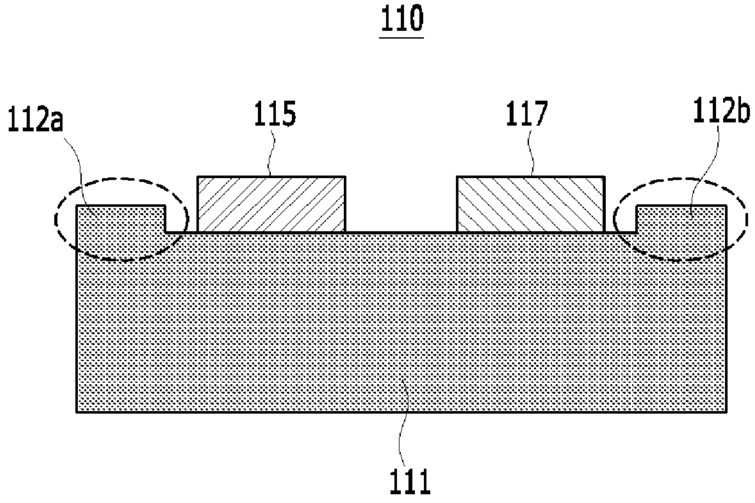
【FIG. 7】
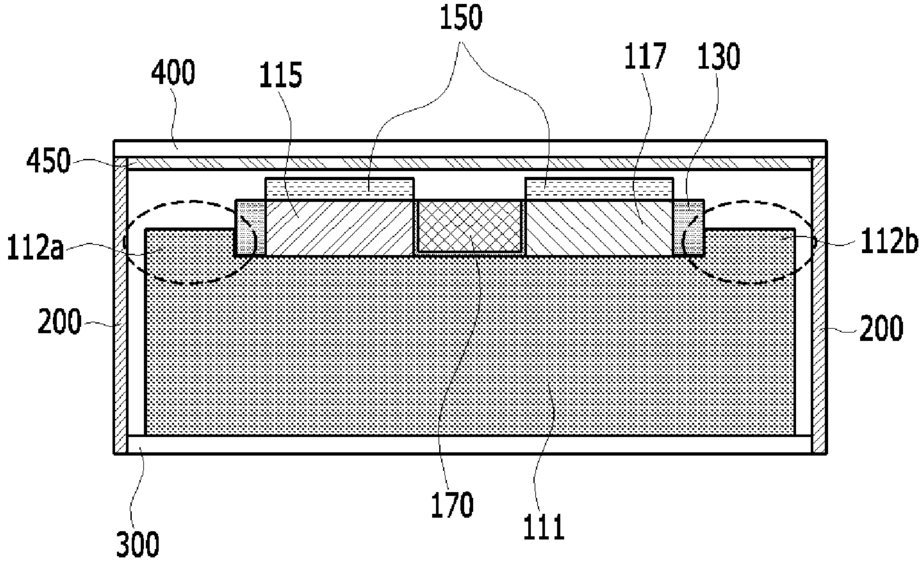

【FIG. 8】
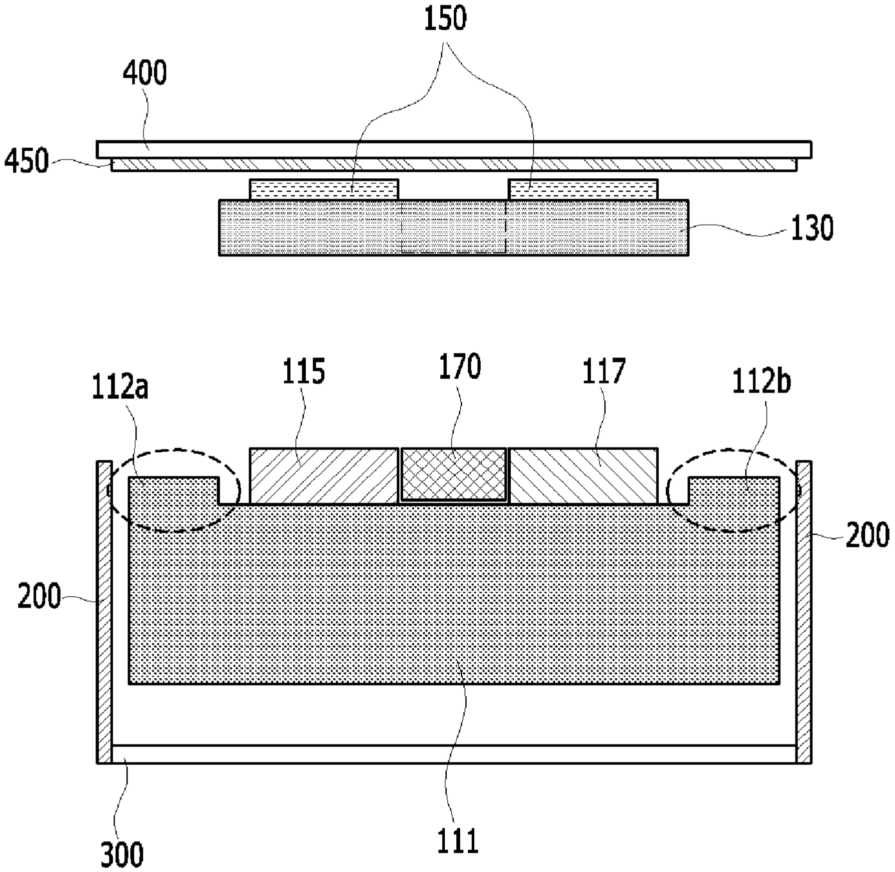

BATTERY CELL, BATTERY MODULE, AND BATTERY PACK INCLUDING THE SAME

CROSS CITATION WITH RELATED APPLICATION(S)

This application is a National Stage Application of International Application No. PCT/KR2022/001001, filed on Jan. 19, 2022, which claims priority to Korean Patent Application No. 10-2021-0009238 filed on Jan. 22, 2021, the disclosure of which is incorporated herein by reference in its entirety.

FIELD

The present disclosure relates to a battery cell, a battery module and a battery pack including the same, and more particularly, to a battery cell, a battery module and a battery pack including the same, in which parts and processes are simplified while increasing the utilization rate of module space.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Among them, in particular, a pouch-type battery having a structure in which a stack-type or stack/folding-type electrode assembly is mounted in a pouch-type battery case of an aluminum laminate sheet is gradually increasing in its usage amount due to low manufacturing cost, small weight, easy deformation, and the like.

FIG. 1 is an exploded perspective view of a conventional battery module. FIG. 2 is a diagram showing a battery cell among the components of FIG. 1. FIG. 3 is an enlarged view of a region a of FIG. 1.

Referring to FIG. 1, the conventional battery module 10 includes a battery cell stack 20 in which a plurality of battery cells 11 are stacked, a mono frame 70 that houses the battery cell stack 20, and end plates 80 that cover the opened front and rear surfaces of the mono frame 70. Here, busbar frames 32 and 33, a busbar 40, and an insulating member 60 are sequentially located between the battery cell stack 20 and the end plate 80.

Referring to FIG. 2, the conventional battery cell 11 is a bidirectional pouch battery cell including a central part 13 and electrode lead parts 15 respectively located on both sides of the central part 13. Here, electrode lead 17 may be protruded from the end part of the electrode lead part 15. Here, the electrode stack in which a positive electrode, a negative electrode, and a separator are stacked is located in the central part 13.

However, referring to FIGS. 2 and 3, in the case of the conventional battery cell stack 20, due to a dead space b formed between the electrode lead parts 15 of the battery cell 11 and a terrace space formed on both sides of the battery cell 11, there is a problem that the space utilization rate in the battery module 10 is lowered. Moreover, the conventional battery cell 11 has a problem that the electrode lead part 15 is formed on a side part of the battery cell 11 located in the width direction of the battery cell 11, which is very limited in extending the width of the electrode lead.

In addition, referring to FIGS. 1 and 2, a flexible printed circuit (FPC) 50 for voltage sensing, temperature sensing, etc. with respect to the electrode lead parts 15 located on both sides of the battery cell 11 may be located on the upper surface of the battery cell stack 20. Conventionally, the busbar frames 32 and 33 at both ends are connected through the flexible printed circuit 50, and the cover plate 31 is installed on the upper end of the flexible printed circuit 50, thereby attempting to prevent damage to the flexible printed circuit 50 that may occur when stored in the mono frame 70.

In this manner, as the conventional battery module 10 includes the battery cell 11, which is a bidirectional pouch battery cell, there is a problem that a sensing line component such as a flexible printed circuit board (FPC) connecting both sides of the battery cell 11 is separately required, and additional parts such as the cover plate 31 are required. In addition, there is a problem that parts and processes are complicated in that the busbar frame 32, the busbar 40, the insulating member 60, and the end plate 80 are respectively disposed on both sides of the battery cell 11.

Therefore, there is a need to develop a battery cell having simplified parts and processes while increasing the utilization rate of module space, and a battery module including the same.

SUMMARY

It is an object of the present disclosure to provide a battery cell, a battery module and a battery pack including the same, in which parts and processes are simplified while increasing the utilization rate of module space.

The objects of the present disclosure are not limited to the aforementioned objects, and other objects which are not described herein should be clearly understood by those skilled in the art from the following detailed description and the accompanying drawings.

According to one embodiment of the present disclosure, there is provided a battery cell comprising: a battery case accommodating an electrode assembly and having outer periphery sealed by heat fusion; and an electrode lead electrically connected to an electrode tab included in the electrode assembly and protruding outward of the battery case, wherein a first protrusion and a second protrusion protruding in a direction to which the electrode lead protrudes are formed on one side surface of the battery case, and wherein the electrode lead is located between the first protrusion and the second protrusion.

One side surface of the electrode assembly may be extended along a direction to which the first protrusion and the second protrusion protrude.

The electrode lead includes a positive electrode lead and a negative electrode lead, the positive electrode lead may be located so as to be spaced apart from the first protrusion, and the negative electrode lead may be located so as to be spaced apart from the second protrusion.

The battery case includes a pair of first side surfaces facing each other and a pair of second side surfaces facing each other, and the first side surface may have a length longer than the second side surface.

The first protrusion and the second protrusion may be formed on one of the pair of first side surfaces.

The first protrusion and the second protrusion may be respectively located at both ends of the first side surface.

According to another embodiment of the present disclosure, there is provided a battery module comprising the battery cell of claim 1, the battery module comprising: a battery cell stack comprising a plurality of the battery cells; and a module frame accommodating the battery cell stack, wherein the battery cell is configured such that the first protrusion and the second protrusion are disposed in a direction toward an upper part of the module frame.

The battery includes a busbar frame located between an upper surface of the battery cell stack and the upper part of the module frame, wherein at least one busbar may be located at the busbar frame.

The busbar frame may be inserted between the first protrusion and the second protrusion.

The electrode lead includes a positive electrode lead and a negative electrode lead, and a sensing member may be located on the upper surface of the battery cell stack, and the sensing member may be located between the positive electrode lead and the negative electrode lead.

The sensing member may be located between the busbar frame and an upper part of the battery cell stack.

The sensing member may be extended along a stacking direction of the battery cell stack.

The module frame may include a lower frame configured such that an upper surface of the battery cell stack is uncovered, and an upper plate that covers the upper surface of the battery cell stack.

An insulating layer may be formed on a lower surface of the upper plate.

The lower frame may include a U-shaped frame configured such that both side surfaces of the battery cell stack are uncovered, and a cover frame that covers the both side surfaces of the battery cell stack.

A heat conductive resin layer may be formed on a bottom surface of the lower frame.

According to yet another embodiment of the present disclosure, there is provided a battery pack comprising the above-mentioned battery module.

According to embodiments, the present disclosure includes the battery cell having a new structure, and thus can provide a battery cell, a battery module, and a battery pack including the same, in which parts and processes are simplified while increasing the utilization rate of the module space.

The effects of the present disclosure are not limited to the effects mentioned above and additional other effects not described above will be clearly understood from the description of the appended claims by those skilled in the art.

BRIEF DESCRIPTION OF DRAWINGS

FIG. 1 is an exploded perspective view of a conventional battery module;

FIG. 2 is a diagram showing a battery cell among the components of FIG. 1;

FIG. 3 is an enlarged view of a region a of FIG. 1;

FIG. 4 is a perspective view showing a battery module according to an embodiment of the present disclosure;

FIG. 5 is an exploded perspective view of components included in the battery module of FIG. 4;

FIG. 6 is a diagram showing a battery cell among the components of FIG. 5;

FIG. 7 is a cross-sectional view taken along the axis A-A' of FIG. 4;

FIG. 8 is a cross-sectional view of components included in the battery module of FIG. 7 before being coupled to each other.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Hereinafter, a battery module according to an embodiment of the present disclosure will be described. However, the description will be given based on one end surface of the battery module, but is not necessarily limited thereto. Even in the case of the other end surface, it will be described in the same or similar manner.

FIG. 4 is a perspective view showing a battery module according to an embodiment of the present disclosure. FIG. 5 is an exploded perspective view of components included in the battery module of FIG. 4.

Referring to FIGS. 4 and 5, a battery cell 100 according to an embodiment of the present disclosure includes a battery cell stack 120 in which a plurality of battery cells 110 are stacked; and module frames 200, 300 and 400 that house the battery cell stack 120. Further, the busbar frame 130 is located between the upper part of the module frame 200, 300 and 400 and the upper surface of the battery cell stack 120, and at least one busbar 150 may be located in the busbar frame 130.

In one example, the module frames 200, 300 and 400 may include lower frames 200 and 300 in which the upper surface of the battery cell stack 120 is opened, and an upper plate 400 that covers the upper surface of the battery cell stack 120. Here, the lower frames 200 and 300 may be frames in a state in which the upper surface is removed from a frame having the same shape as a mono frame.

In another example, the module frames 200, 300 and 400 may include a cover frame 200, a U-shaped frame 300, and an upper plate 400. More specifically, the cover frame 200 may cover both side surfaces of the battery cell stack 120. Further, the U-shaped frame 300 is opened in the upper surface and both side surface, and may include a bottom part and a side part. Further, the upper plate 400 may cover the upper part of the battery cell stack 120.

Here, the cover frame 200 can function as the lower frames 200 and 300 as the U-shaped frames 300 are coupled or joined to each other. Further, the cover frame 200 can be coupled or joined to both side surfaces of the battery cell stack 120 in a state in which the U-shaped frame 300 and the upper plate 400 are coupled or joined to each other. However, the module frames 200, 300 and 400 are not limited thereto, and may be replaced with frames having other shapes.

Thereby, unlike the conventional battery module 10, the battery module 100 of the present disclosure has a structure in which the end plate 80 may be integrated into the lower frames 200 and 300, so that the structure of the battery module 100 can be further simplified. That is, the parts and processes of the battery module 100 can be simplified, and the space utilization rate can also be further improved.

Referring to FIG. 5, a heat conductive resin layer 310 may be formed on the bottom surfaces of the lower frames 200 and 300. In other words, the heat conductive resin layer 310 is located between the bottom surfaces of the lower frames 200 and 300 and the battery cell stack 120. Here, the lower surface of the battery cell stack 120 may be in direct contact with the heat conductive resin layer 310. In one example, the heat conductive resin layer 310 may be made of a heat transfer member including a heat conductive material.

Thereby, the heat generated in the battery cell stack 120 may be directly transferred to the heat conductive resin layer 310 and cooled, and the cooling performance of the battery module 100 can be further improved.

In another example, the heat conductive resin layer 310 may be formed by applying a heat conductive resin onto the lower surface of the battery cell stack 120 or the bottom surfaces of the lower frames 200 and 300. That is, as the previously applied heat conductive resin is cured, the heat conductive resin layer 310 may be formed.

Thereby, as the heat conductive resin is cured, the lower surface of the battery cell stack 120 and the lower frames 200 and 300 can be stably fixed to each other.

FIG. 6 is a diagram showing a battery cell among the components of FIG. 5.

Referring to FIGS. 5 and 6, in the present embodiment, the battery cell 110 is preferably a pouch type battery cell. Here, the battery cell 110 includes a battery case 111 accommodating an electrode assembly (not shown), and having outer periphery sealed by heat fusion. Here, the battery case 111 may be a laminated sheet including a resin layer and a metal layer. Such a battery cell 110 may be formed in plural numbers, and the plurality of battery cells 110 form a battery cell stack 120 that are stacked so as to be electrically connected to each other. In particular, as shown in FIG. 5, a plurality of battery cells 110 may be stacked in a stacking direction parallel to the x-axis.

Further, the battery cell 110 includes electrode leads 115 and 117 that are electrically connected to the electrode tab included in the electrode assembly, and protrudes outward of the battery case 111. In one example, the electrode leads 115 and 117 include a positive electrode lead 115 that is electrically connected to the positive electrode tab included in the electrode assembly, and a negative electrode lead 117 that is electrically connected to the negative electrode tab included in the electrode assembly. More specifically, the battery cell 110 may be a unidirectional pouch battery cell in which the positive electrode lead 115 and the negative electrode lead 117 are disposed together on the same side surface of the battery case 111.

Thereby, in the battery cell 110 of the present disclosure, the positive electrode lead 115 and the negative electrode lead 117 are located together on one side surface of the battery case 111, whereby the number of terrace parts formed by locating the electrode leads 115 and 117 on one side surface of the battery case 111, that is, the number on the outer peripheral side of the battery case 111 that is heat-fused together with the electrode leads 115 and 117 can be reduced. In addition to this, in the bidirectional battery cell 10 as in the conventional case, a component connecting the positive electrode lead 115 and the negative electrode lead 117 to each other may be omitted, and the separately required busbar frame, end plate, etc. can be integrated into a single unit, which is advantageous in that parts and processes can be simplified.

Further, the battery cell 110 may have a first protrusion **112*a* and a second protrusion 112*b* protruding in a protrusion direction of the electrode leads 115 and 117 on one side surface of the battery case 111. Here, electrode leads 115 and 117 may be located between the first protrusion 112*a* and the second protrusion 112*b*. Further, the positive electrode lead 115 is located so as to spaced apart from the first protrusion 112*a*, and the negative electrode lead 117 may be located so as to be spaced apart from the second protrusion 112*b*. However, according to another embodiment, one of the first protrusion 112*a* and the second protrusion 112*b*** may be omitted.

Here, one side surface of the electrode assembly located in the battery case 111 may be extended along the direction to which the first protrusion **112*a* and the second protrusion 112*b* protrude. In other words, one side surface of the electrode assembly located in the battery case 111 may be extended by a size corresponding to the space formed in the first protrusion 112*a* and the second protrusion 112*b***.

Thereby, according to the present disclosure, in the terrace part of the battery case 111, the battery capacity can be increased by the space within the first protrusion **112*a* and the second protrusion 112*b* of the battery case 111, and the space utilization rate within the lower frames 200 and 300** can also be increased.

Further, the battery case 111 includes a pair of first side surfaces facing each other and a pair of second side surfaces facing each other, and the first side surface may have a length longer than the second side surface. That is, the battery cell 110 of the present disclosure may be a unidirectional battery cell having a relatively long width and a relatively short length.

Here, the first protrusion **112*a* and the second protrusion 112*b* may be formed on one of the pair of first side surfaces. More specifically, the width of the electrode leads 115 and 117 may be less than or equal to the length of the first side surface excluding the length of the first protrusion 112*a* and the second protrusion 112*b*. In one example, the first protrusion 112*a* and the second protrusion 112*b* may be respectively located at both ends of the first side surface, and an adjustable range with the width of the electrode leads 115 and 117** can be further increased.

Thereby, according to the present disclosure, the internal resistance of the battery cell 110 can be adjusted by adjusting the width of the electrode leads 115 and 117 while increasing the space utilization rate in the battery cell 110 by the first protrusion 112*a* and the second protrusion 112*b*. In addition, according to the present disclosure, since the electrode leads 115 and 117 are located on the side surface of the battery case 111 having a relatively large length, the width of the electrode leads 115 and 117 can be increased more freely. In other words, the width of the electrode leads 115 and 117 can be secured relatively large as compared with the conventional case, whereby the internal resistance of the battery cell 110 can be easily reduced. and it is also advantageous in quick charge performance.

FIG. 7 is a cross-sectional view taken along the axis A-A' of FIG. 4. FIG. 8 is a cross-sectional view before components included in the battery module of FIG. 7 are coupled to each other.

Referring to FIGS. 5, 7 and 8, the battery cell stack 120 is mounted in the module frames 200, 300 and 400, wherein the first protrusion 112*a* and the second protrusion 112*b* of the battery cell 110 may be disposed in a direction toward the upper part of the module frames 200, 300 and 400. In other words, the battery cell stack 120 may be disposed in a direction in which the first protrusion 112*a* and the second protrusion 112*b* of the battery cell 110 face the upper plate 400.

Thereby, the lower surface of the battery cell stack 120 may be in contact with the heat conductive resin layer 310, and the side surface of the battery cell 110 having a relatively large length can be in contact with the heat conductive resin layer 310. Therefore, the cooling area between the battery cell 110 and the heat conductive resin layer 310 can be sufficiently secured, and thus, the cooling function by the heat conductive resin layer 310 can be effectively achieved.

Further, unlike the conventional battery module 10, the battery module 100 according to an embodiment of the present disclosure may include one busbar frame 130 and a sensing member 170.

Here, the busbar frame 130 may be formed with a plurality of slits through which the electrode leads 115 and 117 can pass. Further, the electrode leads 115 and 117 of the battery cell 110 can pass through the slit of the busbar frame 130 to be electrically connected to the busbar 150. Here, the plurality of slits formed in one bus bar frame 130 and the busbar 150 may be located so as to be spaced apart from each other with reference to the positive electrode lead 115 and the negative electrode lead 117.

Thereby, in the battery module 100 of the present disclosure, the positive electrode lead 115 and the negative electrode lead 117 can be electrically connected to the respective busbars 150 in one busbar frame 130, and thus, a part of the pair of busbar frames 32, 33 and the pair of busbars 40 of the conventional battery module 100 can be omitted. That is, parts and processes can be more simplified, and the space utilization rate can be further improved.

Further, the busbar frame 130 may be inserted between the first protrusion 112*a* and the second protrusion 112*b*. In one example, the size of the busbar frame 130 may be equal to or smaller than the length between the first protrusion 112*a* and the second protrusion 112*b*. In another example, the busbar frame 130 has a size that covers the entire upper surface of the battery cell stack 120, and at least a part of the busbar frame 130 may be interposed between a first protrusion 112*a* and a second protrusion 112*b*.

Further, the thickness of the busbar frame 130 may be larger than or equal to lengths by which the first protrusion 112*a* and the second protrusion 112*b* are protruded from the battery case 111.

Thereby, the size or thickness of the busbar frame 130 can be appropriately adjusted so that the busbar frame 130 is stably fixed to the battery cell laminate 120, and also the insulation performance between the battery cells 110 of the battery cell stack 120 and the upper parts of the module frames 200, 300 and 400 can be secured.

Further, an insulating layer 450 may be located between the busbar frame 130 and the upper plate 400. More specifically, the insulating layer 450 may be formed on the lower surface of the upper plate 400.

Here, the insulating layer 450 may be made in advance in the form of a film or sheet, and can be attached to the lower surface of the upper plate 400. Here, the insulating layer 450 may be attached to the lower surface of the upper plate 400 by its own adhesive force, or may be attached by forming a separate adhesive layer between the insulating layer 450 and the upper plate 400. In another example, the insulating layer 450 may be formed by applying or coating on the lower surface of the upper plate 400. However, the present disclosure is not limited thereto, and the insulating layer 450 may be formed in various shapes.

In one example, the insulating layer 450 may be manufactured in the form of a film including at least one of polyethylene terephthalate (PET), polycarbonate (PC), polyimide (PI), and polyamide (PA), but is not limited thereto.

Thereby, according to the present disclosure, the insulating performance between the electrode leads 115 and 117 exposed on the busbar frame 130 and the upper plate 400 can be further improved. Further, one of the pair of insulating members 60 of the conventional battery module 10 may be omitted. That is, parts and processes can be more simplified, and the space utilization rate can be further improved.

In addition to this, unlike the conventional battery module 10 in which the insulating member 60 is located on the side surface of the battery cell stack 20, the present disclosure can further improve the insulating performance as the size of the insulating layer 450 is relatively increased, because the insulating layer 450 may be located on the upper surface of the battery cell stack 120.

Further, the sensing member 170 can perform voltage sensing and temperature sensing with respect to the electrode leads 115 and 117 of the battery cell 110 located on the upper surface of the battery cell stack 120. Here, the sensing member 170 may be located on the upper surface of the battery cell stack 120. In other words, the sensing member 170 may be located between the upper surface of the battery cell stack 120 and the busbar frame 130.

Thereby, since the sensing member 170 may be covered by the busbar frame 130, a separate part for protecting the sensing member 170 is not required unlike the conventional battery module 10, and also damage caused by an assembling process or external impact can be prevented.

More specifically, on the upper surface of the battery cell stack 120, the sensing member 170 may be located between the positive electrode lead 115 and the negative electrode lead 117 of the battery cell 110. Here, between the positive electrode lead 115 and the negative electrode lead 117 of the battery cell 110, the sensing member 170 may be extended along the stacking direction (x-axis direction) of the battery cell stack.

Thereby, in the present invention, the sensing member 170 may be disposed in a space already formed between the positive electrode lead 115 and the negative electrode lead 117. Thus, in view of the point that a separate space for disposing the sensing member 170 is not required, the energy density of the battery itself and the space utilization rate within the module can be improved. In addition, the positive electrode lead 115 and the negative electrode lead 117 are located adjacent to each other, so that there is no need to include a cable such as a separate flexible flat cable in the sensing member 170, or even if included, the length of the cable may be relatively greatly reduced, thereby more simplifying parts and processes.

A battery pack according to another embodiment of the present disclosure includes the battery module described above. Meanwhile, one or more battery modules according to the present embodiment can be packaged in a pack case to form a battery pack.

The above-mentioned battery module and the battery pack including the same can be applied to a vehicle means such as an electric bicycle, an electric vehicle, or a hybrid vehicle, but the present disclosure is not limited thereto, and is applicable to various devices that can use a battery module and the battery pack including the same, which also falls under the scope of the present disclosure.

Although the invention has been shown and described with reference to the preferred embodiments, the scope of the present disclosure is not limited thereto, and numerous changes and modifications can be devised by those skilled in the art using the principles of the invention defined in the appended claims, which also falls within the spirit and scope of the present disclosure.

DESCRIPTION OF REFERENCE NUMERALS

100: battery module
110: battery cell
120: battery cell stack
130: busbar frame
150: busbar
170: sensing member
200: cover frame
300: U-shaped frame
310: heat conductive resin layer
400: upper plate

The invention claimed is:

1. A battery cell comprising:
a battery case accommodating an electrode assembly and having outer periphery sealed by heat fusion; and
an electrode lead electrically connected to an electrode tab included in the electrode assembly and protruding outward of the battery case,
wherein a first protrusion and a second protrusion protruding in a direction to which the electrode lead protrudes are formed on one side surface of the battery case,
wherein the electrode lead is located between the first protrusion and the second protrusion,
wherein the battery case comprises a pair of first side surfaces facing each other and a pair of second side surfaces facing each other and the first side surface has a length longer than the second side surface,
wherein the first protrusion and the second protrusion are formed on one of the pair of first side surfaces,
wherein the battery cell comprises a plurality of battery cells,
wherein a battery module comprises:
a battery cell stack comprising the plurality of the battery cells; and
a module frame accommodating the battery cell stack,
wherein each of the plurality of battery cells is configured such that the first protrusion and the second protrusion are disposed in a direction toward an upper part of the module frame,
wherein, in the one of the pairs of side surfaces on which the first protrusion and second protrusion are formed, the electrode assembly in the battery case extends by a size corresponding to a space in the first protrusion and the second protrusion.

2. The battery cell of claim 1, wherein one side surface of the electrode assembly is extended along a direction to which the first protrusion and the second protrusion protrude.

3. The battery cell of claim 1, wherein the electrode lead comprises a positive electrode lead and a negative electrode lead,
wherein the positive electrode lead is located so as to be spaced apart from the first protrusion, and
wherein the negative electrode lead is located so as to be spaced apart from the second protrusion.

4. The battery cell of claim 1, wherein the first protrusion and the second protrusion are respectively located at both ends of the first side surface.

5. The battery module of claim 1, wherein the battery module further comprises a busbar frame located between an upper surface of the battery cell stack and the upper part of the module frame,
wherein at least one busbar is located at the busbar frame.

6. The battery module of claim 5, wherein the busbar frame is inserted between the first protrusion and the second protrusion.

7. The battery module of claim 5, wherein the electrode lead comprises a positive electrode lead and a negative electrode lead, and
wherein a sensing member is located on the upper surface of the battery cell stack, and the sensing member is located between the positive electrode lead and the negative electrode lead.

8. The battery module of claim 7, wherein the sensing member is located between the busbar frame and an upper part of the battery cell stack.

9. The battery module of claim 8, wherein the sensing member is extended along a stacking direction of the battery cell stack.

10. The battery module of claim 1, wherein the module frame comprises
a lower frame configured such that an upper surface of the battery cell stack is uncovered, and an upper plate that covers the upper surface of the battery cell stack.

11. The battery module of claim 10, wherein an insulating layer is formed on a lower surface of the upper plate.

12. The battery module of claim 10, wherein the lower frame comprises a U-shaped frame configured such that both side surfaces of the battery cell stack are uncovered, and a cover frame that covers the both side surfaces of the battery cell stack.

13. The battery module of claim 10, wherein a heat conductive resin layer is formed on a bottom surface of the lower frame.

14. A battery pack comprising the battery module of claim 1.

15. The battery module of claim 6, wherein a thickness of the busbar frame is larger than or equal to lengths by which the first protrusion and the second protrusion are protruded from the battery case.

* * * * *